US007673065B2

(12) United States Patent
Srinivasan et al.

(10) Patent No.: US 7,673,065 B2
(45) Date of Patent: Mar. 2, 2010

(54) SUPPORT FOR SHARING COMPUTATION BETWEEN AGGREGATIONS IN A DATA STREAM MANAGEMENT SYSTEM

(75) Inventors: Anand Srinivasan, Bangalore (IN); Namit Jain, Santa Clara, CA (US); Shailendra Kumar Mishra, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 257 days.

(21) Appl. No.: 11/977,440

(22) Filed: Oct. 20, 2007

(65) Prior Publication Data
US 2009/0106198 A1    Apr. 23, 2009

(51) Int. Cl.
*G06F 15/16*    (2006.01)
*G06F 15/167*    (2006.01)
(52) U.S. Cl. .................. 709/231; 709/213; 709/216; 709/246
(58) Field of Classification Search .......... 709/231, 709/213, 216, 246
See application file for complete search history.

(56) References Cited

U.S. PATENT DOCUMENTS

| 6,985,904 | B1* | 1/2006 | Kaluskar et al. | 707/101 |
|---|---|---|---|---|
| 7,145,938 | B2* | 12/2006 | Takeuchi et al. | 375/147 |
| 2009/0106189 | A1* | 4/2009 | Jain et al. | 707/2 |
| 2009/0106190 | A1* | 4/2009 | Srinivasan et al. | 707/2 |
| 2009/0106214 | A1* | 4/2009 | Jain et al. | 707/4 |
| 2009/0106215 | A1* | 4/2009 | Jain et al. | 707/4 |

OTHER PUBLICATIONS

Arasu, A. et al. "STREAM: The Stanford Data Stream Management System", Department of Computer Science, Stanford University, 2004, pp. 21.
Chandrasekaran, S. et al. "TelegraphCQ: Continuous Dataflow Processing for an Uncertain World", Proceedings of CIDR 2003, pp. 12.
Chen, J. et al. "NiagaraCQ: A Scalable Continuous Query System for Internet Databases", Proceedings of 2000 ACM SIGMOD, pp. 12.
Terry, D.B. et al. "Continuous queries over append-only databases", Proceedings of 1992 ACM SIGMOD, pp. 321-330.

(Continued)

*Primary Examiner*—Vivek Srivastava
*Assistant Examiner*—Thomas Duong
(74) *Attorney, Agent, or Firm*—Silicon Valley Patent Group LLP; Omkar Suryadevara

(57) ABSTRACT

A computer is programmed to process a continuous query that is known to perform a new aggregation on one or more stream(s) of data, using one or more other aggregations on the stream(s). The computer creates an operator to execute the continuous query, and schedules the operator for execution in a specific order. In several embodiments, the computer determines the order based on dependency of the new aggregation on other aggregation(s), and on the order of performance of the other aggregation(s). The new aggregation is scheduled for performance after performance of each of the other aggregations. The computer is further programmed to pass results of the other aggregations to the new aggregation, by execution of a predetermined function. Support for use of the other aggregations results within the new aggregation eliminates redundant computation of the other aggregations within the new aggregation. The new aggregation may be user defined or built-in.

8 Claims, 9 Drawing Sheets

OTHER PUBLICATIONS

Arasu, A. et al. "The CQL Continuous Query Language: Semantic Foundation and Query Execution", VLDB Journal, vol. 15, Issue 2, Jun. 2006, pp. 32.

Arasu, A. et al. "An Abstract Semantics and Concrete Language for Continuous Queries over Streams and Relations", 9th International Workshop on Database programming languages, Sep. 2003, pp. 12.

Babu, S. et al. "Continuous Queries over Data Streams", SIGMOD Record, Sep. 2001, pp. 12.

Entire Prosecution History of U.S. Appl. No. 11/977,439, filed Oct. 20, 2007, Anand Srinivasan et al.

Entire Prosecution History of U.S. Appl. No. 11/977,437, filed Oct. 20, 2007, Anand Srinivasan et al.

* cited by examiner

```
Q1: Select B, max(A)
    From   S1 [Rows 50,000]
    Group By B
```

```
Q2: Select Istream(*)
    From   S1 [Rows 40,000], S2 [Range 600 Seconds]
    Where  S1.A = S2.A
```

FIG. 2B

CREATE FUNCTION variance (c1 int) RETURN float AGGREGATE USING 'myPkg.Variance' SUPPORTS INCREMENTAL COMPUTATION USES Sum, Count

- 261 CREATE FUNCTION
- 262 variance
- 263 (c1 int)
- 264 RETURN
- 265 float
- 266 AGGREGATE USING
- 267 'myPkg.Variance'
- 268 SUPPORTS INCREMENTAL COMPUTATION
- 269 USES
- 270 Sum, Count

FIG. 2C

CREATE FUNCTION average (c1 int) RETURN float AGGREGATE USING 'myPkg.Average' SUPPORTS INCREMENTAL COMPUTATION USES Sum, Count

CREATE FUNCTION stddev (c1 int) RETURN float AGGREGATE USING 'myPkg.StdDev' SUPPORTS INCREMENTAL COMPUTATION USES Variance

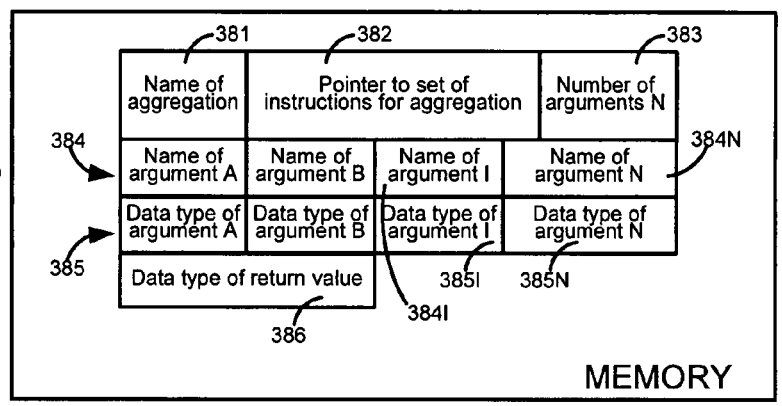

MEMORY

SUPPORT FOR SHARING COMPUTATION BETWEEN AGGREGATIONS IN A DATA STREAM MANAGEMENT SYSTEM

CROSS-REFERENCE TO RELATED APPLICATIONS

This application is related to and incorporates by reference herein in its entirety, a commonly-owned U.S. application Ser. No. 11/977,439 entitled "SUPPORT FOR USER DEFINED AGGREGATIONS IN A DATA STREAM MANAGEMENT SYSTEM" filed on Oct. 20, 2007 by the inventors of the current patent application.

This application is also related to and incorporates by reference herein in its entirety, a commonly-owned U.S. application Ser. No. 11/977,437 entitled "SUPPORT FOR INCREMENTALLY PROCESSING USER DEFINED AGGREGATIONS IN A DATA STREAM MANAGEMENT SYSTEM" filed on Oct. 20, 2007 by the inventors of the current patent application.

BACKGROUND

It is well known in the art to process queries over continuous streams of data using one or more computer(s) that may be called a data stream management system (DSMS). Such a system may also be called an event processing system (EPS) or a continuous query (CQ) system, although in the following description of the current patent application, the term "data stream management system" or its abbreviation "DSMS" is used. DSMS systems typically receive from a user a textual representation of a query (called "continuous query") that is to be applied to a stream of data. Data in the stream changes over time, in contrast to static data that is typically found stored in a database. Examples of data streams are: real time stock quotes, real time traffic monitoring on highways, and real time packet monitoring on a computer network such as the Internet.

FIG. 1A illustrates a prior art DSMS built at the Stanford University, in which data streams from network monitoring can be processed, to detect intrusions and generate online performance metrics, in response to queries (called "continuous queries") on the data streams. Note that in such data stream management systems (DSMS), each stream can be infinitely long and the data can keep arriving indefinitely and hence the amount of data is too large to be persisted by a database management system (DBMS) into a database.

As shown in FIG. 1B a prior art DSMS may include a continuous query compiler that receives a continuous query and builds a physical plan which consists of a tree of natively supported operators. Any number of such physical plans (one plan per query) may be combined together, before DSMS starts normal operation, into a global plan that is to be executed. When the DSMS starts execution, the global plan is used by a query execution engine (also called "runtime engine") to identify data from one or more incoming stream (s) that matches a query and based on such identified data the engine generates output data, in a streaming fashion.

As noted above, one such system was built at Stanford University, in a project called the Standford Stream Data Management (STREAM) Project which is documented at the URL obtained by replacing the ? character with "/" and the % character with "." in the following: http:??www-db%stanford%edu?stream. For an overview description of such a system, see the article entitled "STREAM: The Stanford Data Stream Management System" by Arvind Arasu, Brian Babcock, Shivnath Babu, John Cieslewicz, Mayur Datar, Keith Ito, Rajeev Motwani, Utkarsh Srivastava, and Jennifer Widom which is to appear in a book on data stream management edited by Garofalakis, Gehrke, and Rastogi. The just-described article is available at the URL obtained by making the above described changes to the following string: http:??dbpubs%stanford%edu?pub?2004-20. This article is incorporated by reference herein in its entirety as background.

For more information on other such systems, see the following articles each of which is incorporated by reference herein in its entirety as background:

[a] S. Chandrasekaran, O. Cooper, A. Deshpande, M. J. Franklin, J. M. Hellerstein, W. Hong, S. Krishnamurthy, S. Madden, V. Ramna, F. Reiss, M. Shah, "TelegraphCQ: Continuous Dataflow Processing for an Uncertain World", Proceedings of CIDR 2003;

[b] J. Chen, D. Dewitt, F. Tian, Y. Wang, "NiagaraCQ: A Scalable Continuous Query System for Internet Databases", PROCEEDINGS OF 2000 ACM SIGMOD, p 379-390; and

[c] D. B. Terry, D. Goldberg, D. Nichols, B. Oki, "Continuous queries over append-only databases", PROCEEDINGS OF 1992 ACM SIGMOD, pages 321-330.

Continuous queries (also called "persistent" queries) are typically registered in a data stream management system (DSMS) prior to its operation on data streams. The continuous queries are typically expressed in a declarative language that can be parsed by the DSMS. One such language called "continuous query language" or CQL has been developed at Stanford University primarily based on the database query language SQL, by adding support for real-time features, e.g. adding data stream S as a new data type based on a series of (possibly infinite) time-stamped tuples. Each tuple s belongs to a common schema for entire data stream S and the time t increases monotonically. Note that such a data stream can contain 0, 1 or more pairs each having the same (i.e. common) time stamp.

Stanford's CQL supports windows on streams (derived from SQL-99) based on another new data type called "relation", defined as follows. A relation R is an unordered group of tuples at any time instant t which is denoted as R(t). The CQL relation differs from a relation of a standard relational database accessed using SQL, because traditional SQL's relation is simply a set (or bag) of tuples with no notion of time, whereas the CQL relation (or simply "relation") is a time-varying group of tuples (e.g. the current number of vehicles in a given stretch of a particular highway). All stream-to-relation operators in Stanford's CQL are based on the concept of a sliding window over a stream: a window that at any point of time contains a historical snapshot of a finite portion of the stream. Syntactically, sliding window operators are specified in CQL using a window specification language, based on SQL-99.

For more information on Stanford University's CQL, see a paper by A. Arasu, S. Babu, and J. Widom entitled "The CQL Continuous Query Language: Semantic Foundation and Query Execution", published as Technical Report 2003-67 by Stanford University, 2003 (also published in VLDB Journal, Volume 15, Issue 2, June 2006, at Pages 121-142). See also, another paper by A. Arasu, S. Babu, J. Widom, entitled "An Abstract Semantics and Concrete Language for Continuous Queries over Streams and Relations" in 9th Intl Workshop on Database programming languages, pages 1-11, September 2003. The two papers described in this paragraph are incorporated by reference herein in their entirety as background.

An example to illustrate continuous queries is shown in FIGS. 1C-1E which are reproduced from the VLDB Journal paper described in the previous paragraph. Specifically, FIG. 1E illustrates a merged STREAM query plan for two continuous queries, Q1 and Q2 over input streams S1 and S2. Query Q1 of FIG. 1E is shown in detail in FIG. 1C expressed in CQL as a windowed-aggregate query: it maintains the maximum value of S1:A for each distinct value of S1:B over a 50,000-tuple sliding window on stream S1. Query Q2 shown in FIG. 1D is expressed in CQL and used to stream the result of a sliding-window join over streams S1 and S2. The window on S1 is a tuple-based window containing the last 40,000 tuples, while the window on S2 is a 10-minutes time-based window.

Several DSMS of prior art, such as Stanford University's DSMS treat queries as fixed entities and treat event data as an unbounded collection of data elements. This approach has delivered results as they are computed in near real time. However, once queries have registered and such a prior art DSMS begins to process event data, the query plan cannot be changed, in prior art systems known to the current inventors. In one prior art DSMS, even after it begins normal operation by executing a continuous query Q1, it is possible for a human (e.g. network operator) to register an "ad-hoc continuous query" Q2, for example to check on congestion in a network, as described in an article by Shivnath Babu and Jennifer Widom entitled "Continuous Queries over Data Streams" published as SIGMOD Record, September 2001. The just-described paper is incorporated by reference herein in its entirety as background. Such a query Q2 may be written to find a fraction of traffic on a backbone link that is coming from a customer network.

Unlike a research DSMS of the kind described above, a DSMS for use in processing real world time-varying data streams is limited if it only allows queries to use built-in (i.e. native) aggregations, such as SUM, COUNT, AVG. There appears to be a long felt and unsolved need for real-time support of aggregations (also called aggregate functions) that may be defined by the user, depending on the application.

SUMMARY

A computer is programmed in accordance with the invention to implement a data stream management system (DSMS) to accept a command for creation of a new aggregation defined by a user as being based on one or more other aggregation(s). A command to register a new aggregation is received during normal operation of the computer. The command identifies a location of a set of instructions that implement the new aggregation. In some embodiments, the command is recognized as using other aggregation(s) by presence of one or more predetermined words in the command and identification of the other aggregation(s). In response to such a command, the computer creates metadata identifying in a metadata repository the new aggregation, as well as its dependency on the other aggregations identified in the command.

The new aggregation is thereafter used by the computer to accept and process new continuous queries. In many embodiments, on receipt of a new continuous query that uses the new aggregation, the computer creates an operator to execute the new continuous query, using a generic opcode designed to invoke performance of aggregation(s). This newly-created operator is scheduled for performance in a specific order that is automatically determined by the computer programmed in accordance with the invention. Specifically, the computer is programmed to determine the order based on the dependency of the new aggregation on the other aggregation(s), and on the order of performance of the other aggregation(s). The new aggregation is scheduled for performance after the performance of each of the other aggregations which it uses. The computer is further programmed to pass results of the other aggregations to the new aggregation, by execution of a predetermined function in a set of instructions prepared by the user, to implement the new aggregation.

In certain embodiments, the new aggregation's instantiation is performed during query execution, i.e. while the newly-created operator is itself being executed. In these embodiments, receipt of data from a stream causes the operator to automatically create an instance, based on the set of instructions supplied by the user, followed by passing the results of other aggregations needed by a function, followed by execution of the function on the data. The function uses the results of other aggregations, as received from a query execution engine, in performing its aggregation on the data. Such use of the other aggregations results shares computation between the new aggregation and the other aggregations, thereby to avoid redundantly performing the other aggregations within the new aggregation.

BRIEF DESCRIPTION OF THE DRAWINGS

FIGS. 2B-2D illustrate three examples of a command to define a UDA that is accepted by the extended DSMS of FIG. 2A.

FIG. 3B illustrates, in a block diagram, a metadata structure created by the method of FIG. 2A to map an aggregation name to a location of the set of instructions to be performed for the aggregation.

DETAILED DESCRIPTION

Figure 1A:
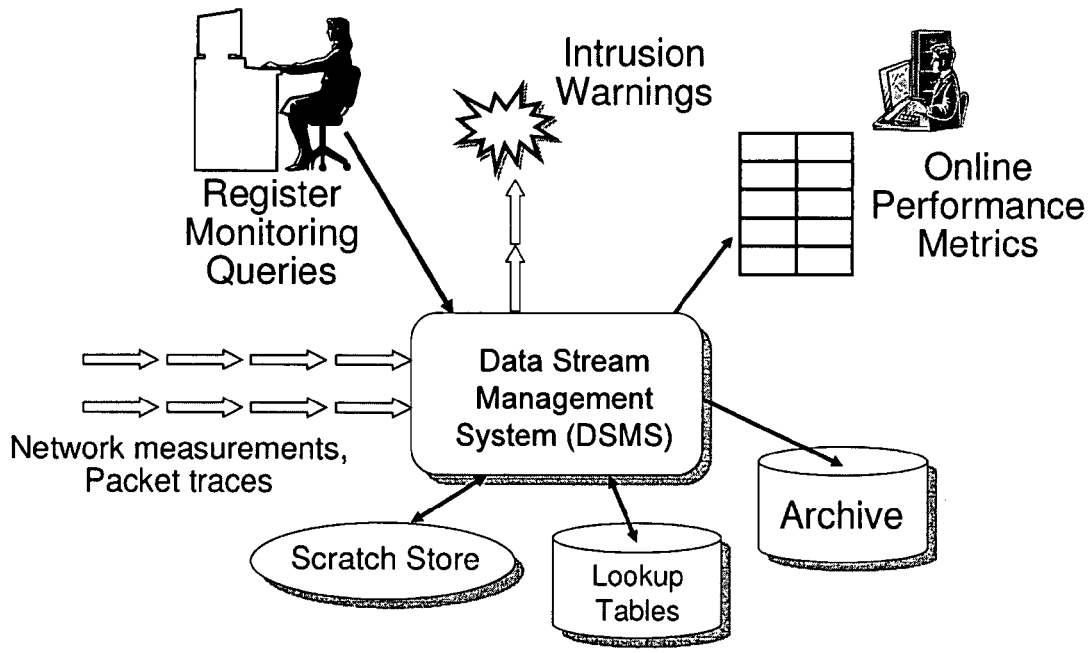
FIGS. 1A and 1B illustrate, in a high level diagram and an intermediate level diagram respectively, a data stream management system of the prior art.
Figure 1B:
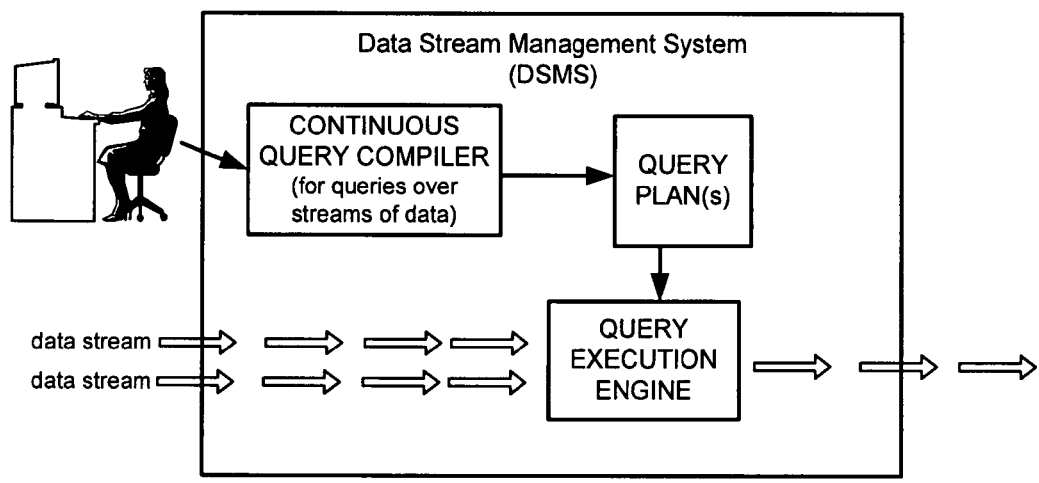
Figures 1C, 1D, 1E:
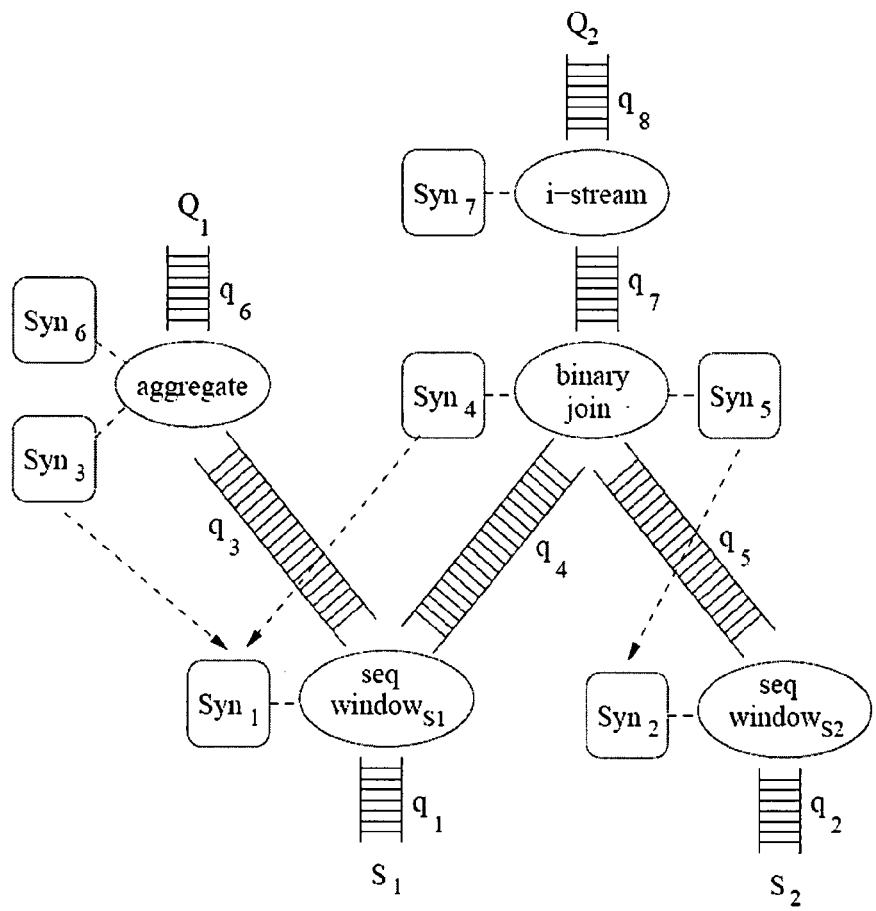
FIGS. 1C and 1D illustrate two queries expressed in a continuous query language (CQL) of the prior art.
FIG. 1E illustrates a query plan of the prior art for the two continuous queries of FIGS. 1C and 1D.

Many embodiments of the invention use a DSMS whose continuous query language (CQL) natively supports certain standard SQL keywords, such as a SELECT command having a FROM clause and in addition also supports windowing functions required for stream and/or relation operations. Note that even though several keywords and/or syntax may be used identically in both SQL and CQL, the semantics are different for these two languages because SQL may be used to define queries on stored data in a database whereas CQL is used to define queries on transient data in a data stream that changes over time.

A computer which implements a DSMS in accordance with the invention is programmed with certain software in several embodiments called an aggregation definition module and a continuous query compiler, as discussed below in reference to FIG. 2A. Any aspects of the computer which are not described below are similar or identical to a computer described in the published literature about the Stanford Stream Data Management (STREAM) Project, as discussed in the Background section above. An aggregation definition module is implemented in accordance with the invention to receive and dynamically act on a command to create a new aggregation which is to be recognized in new continuous queries that are received thereafter, and executed in a manner similar or identical to built-in aggregations for data streams such as MAX. For example, the user may define variance as their user defined aggregation, to find and return the variance of asset of numbers, assuming this is not a built-in aggregation of the DSMS.

Of note, the aggregation definition module is designed to accept such creation command(s) on the fly, i.e. during normal operation of the DSMS on existing queries. Moreover, a continuous query compiler is implemented in accordance with the invention to receive and act on a new continuous query q that uses a user defined aggregation a, also on the fly during normal operation of the DSMS on existing queries. Accordingly, such a DSMS in accordance with the invention is hereinafter referred to as an extended DSMS.

Extended DSMS 200 (FIG. 2A) includes a compiler or interpreter for a predetermined non-database language, also called procedural language, in which the user writes a set of instructions to be performed by extended DSMS 200 in response to a user defined aggregation a. Specifically, a user writes a set of instructions 201 for aggregation a in the predetermined language, such as Java and having a predetermined name as specified in an interface definition. An example of a public interface supported by extended DSMS 200 of some embodiments is illustrated in Subsection A below.

The user stores the set of instructions 201 in store 280 within extended DSMS 200 (via line 242) during normal operation of DSMS 200, i.e. while a number of queries (also called existing queries) are being currently processed. Additionally the user also issues a command 202 to extended DSMS 200 (via line 242), to create user defined aggregation a. In response to command 202, extended DSMS 200 dynamically stores command 202 (while continuing to process queries in the normal manner), for use in validating new queries.

An illustration of command 202 is shown in FIG. 2B. Command 202 is typically typed by a user as a string of characters which starts with one or more reserved word(s) 261 (FIG. 2B) such as CREATE FUNCTION. Alternative embodiments may use other words or use more than two words. In many embodiments, the syntax for the CREATE FUNCTION statement in CQL as described herein conforms to the syntax of SQL (as used in prior art DBMS, such as Oracle 10gR1).

The command 202 also has a number of arguments which follow keyword(s) 261, such as aggregation's name 262 and argument list 263. Aggregation name 262 is illustrated in FIG. 2B to have the value variance. This value is chosen by the user as the aggregation name to be used in continuous queries, to invoke the set of instructions 201. Argument list 263 is a listing of the aggregation's arguments surrounded by brackets. Argument list 263 is illustrated in FIG. 2B to consist of one argument, namely integer, which is the data type of inputs to the set of instructions 201.

Moreover, command 202 has one or more clauses, introduced by reserved words which may be optionally followed by arguments. Command 202 has two clauses starting with reserved word 264 and reserved words 266 respectively followed by argument 265 and 267 respectively. The value of reserved word 264 is shown in FIG. 2B as RETURN and its argument 265 identifies the data type of the value to be returned by the aggregation. The reserved words 266 have the value "AGGREGATE USING" and their argument 267 identifies a user-written Java class named "Variance" that is implemented in the package "myPkg".

Command 202 also includes one or more reserved word(s) 268, illustrated in FIG. 2B as being three in number and having the value "SUPPORTS INCREMENTAL COMPUTATION". As will be apparent to the skilled artisan, other such word or words may be used in other embodiments. Moreover such word(s) may be in different locations. For example, in an alternative embodiment, a single word INCREMENTAL is used between "CREATE" and "FUNCTION" in the keywords 261. Regardless of the precise word(s) and location, presence of such predetermined word(s) 268 in command 202 indicates to extended DSMS 200 that certain functions written by the user, within the set of instructions 201 to execute the aggregation, are to be invoked incrementally. Incremental invocation is performed once per each change in a window, e.g. when a message ("plus" message) has its tuple added to a window and/or when the message ("minus" message), whose tuple is currently in the window, is removed from the window. In some embodiments, the user may use reserved word(s) 268 in command 202 only if the user has written two functions, namely a plus function to incrementally process plus messages, and a minus function to incrementally process minus messages.

Command 202 further includes one or more reserved word(s) 269, illustrated in FIG. 2B as being one in number and having the value "USES" followed by a list of one or more aggregations 270, e.g. "Sum" and "Count" that are separated by commas in this example. Accordingly, in this example, variance is a user defined aggregation that is implemented by the Java class Variance in the package myPkg. Further, Variance supports an incremental style of computation and uses the results of the aggregations Sum and Count. Command 202 is further illustrated by two additional examples in FIGS. 2C and 2D, wherein the aggregation names 262C and 262D are average and stddev that are respectively located in user-written Java classes identified in arguments 267C and 267D as being named "Average" and "StdDev" implemented in the package "myPkg." Also, as per aggregation 270C identified in FIG. 2C, StdDev uses the results of the aggregation Variance and Average.

As will be apparent to the skilled artisan, other embodiments may have other clauses, reserved words, arguments and values thereof. Moreover, the order of various portions of command 202 (FIG. 2B), relative to one another, can be different depending on the embodiment. However, note that in order for extended DSMS 200 to find a Java class when instantiating function f1, the user must place their package "myPkg" in an appropriate location in the file system that is reachable via a path normally used by extended DSMS 200 to load and execute Java classes. Accordingly, if a path is appropriately set up and known to the user, extended DSMS 200 can receive the user's software (set of instructions 201) via such a path at any time relative to normal operations (i.e. the extended DSMS can be up and running and processing existing continuous queries).

The user-written Java class Variance within package myPkg must contain (1) a factory method of a predetermined name, to instantiate the aggregation, (2) a release method, also of a predetermined name, to release the memory occupied by an instantiated aggregation (i.e. an instance), and (3) the aggregation itself which includes (a) an initialize function to reset state variables and related memory in an instance of the aggregation; and (b) one or more versions of a handle function which is to process (i.e. handle) each tuple. A set of instructions 201 representing such software is illustrated below, in Subsection A.

An example of a query that uses a user-defined aggregation is as follows. The user has registered the following query (after defining "variance" and "stddev" as user-defined aggregations in a DSMS that does not natively support the average function):

Q1: Select C1, variance (C2), stddev(C2) from S[range 10] group by C1

Figure 2A:
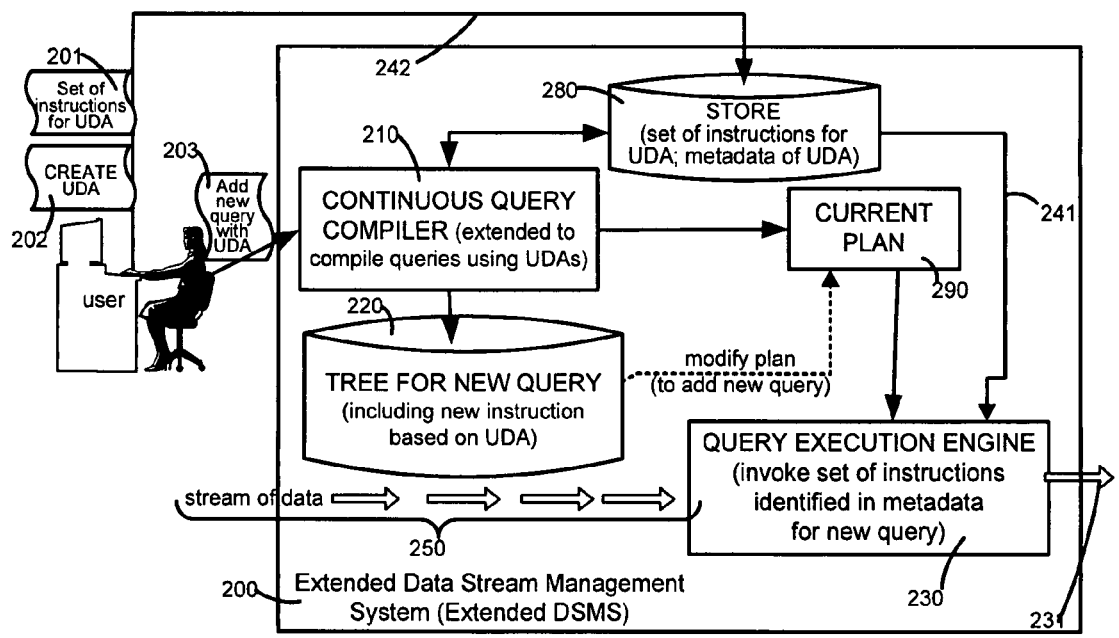
FIG. 2A illustrates, in an intermediate level diagram, a data stream management system (DSMS) that has been extended in accordance with the invention to support use of an aggregation that is based on other aggregation(s).
Figure 2E:
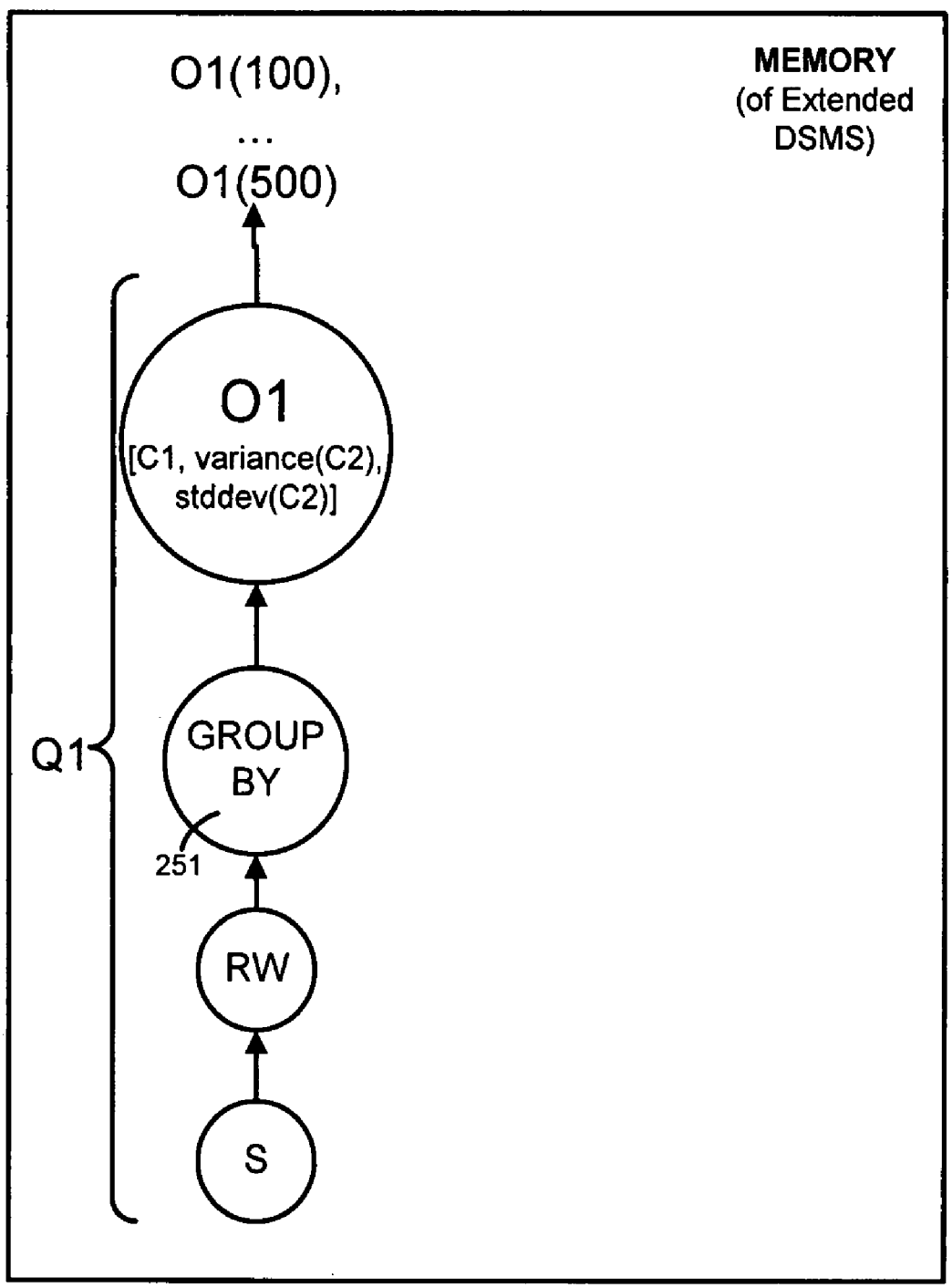
FIG. 2E illustrates, an example of a tree of operators with one operator containing a user-defined aggregation function, in accordance with the invention.

Accordingly, this query is automatically compiled as shown in FIG. 2C, and it includes a group by operator 251 (which is one example of a DSMS operator) that is internally implemented to invoke the user-defined aggregation function average. When Q1's execution is started at time 100, an output stream (e.g. included in stream 231 of FIG. 2A) for values of O1 at each of several time instants, 100, 101, . . . 500 gets generated (assuming current time is 500). In one embodiment, various aggregations that depend on each other in a query (such as Q1) are sorted in reverse topological order (as shown in FIGS. 3C-3E, discussed below).

Figure 3A:
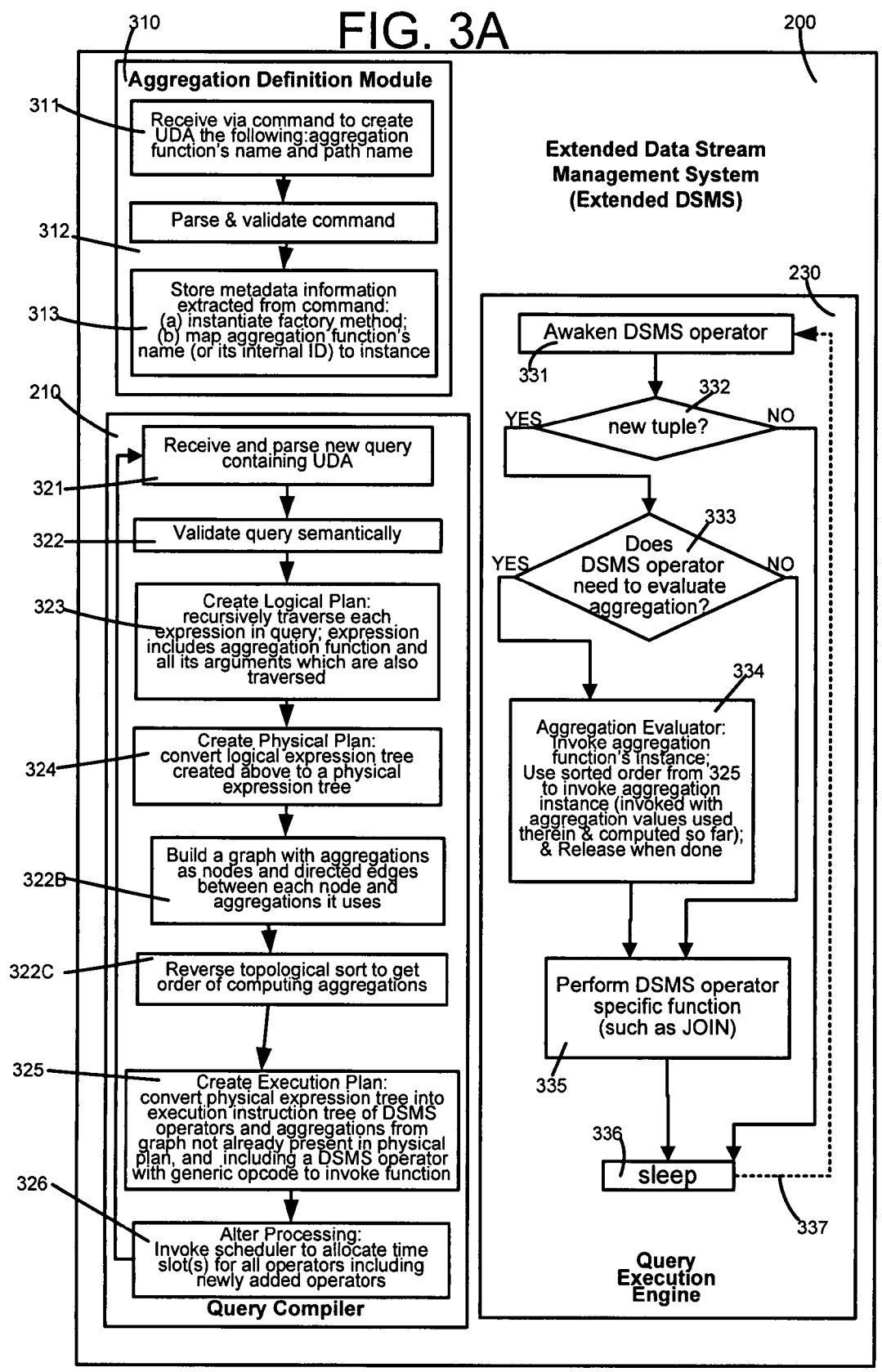
FIG. 3A illustrates, in flow charts, methods that are executed by the extended DSMS of FIG. 2A, in some embodiments of the invention to obtain (and use) a modified plan by addition of new continuous queries that share computation across aggregations.
Figure 3C:
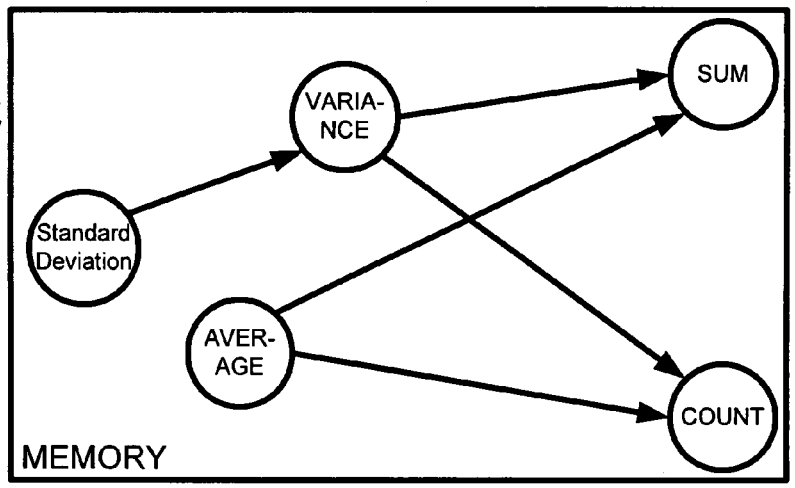
FIGS. 3C-3E illustrate, in respective graphs, dependencies of aggregations, a topological sorting of the aggregations, and temporal sequence of execution of the aggregations, in one illustrative embodiment of the invention.
Figure 3D:
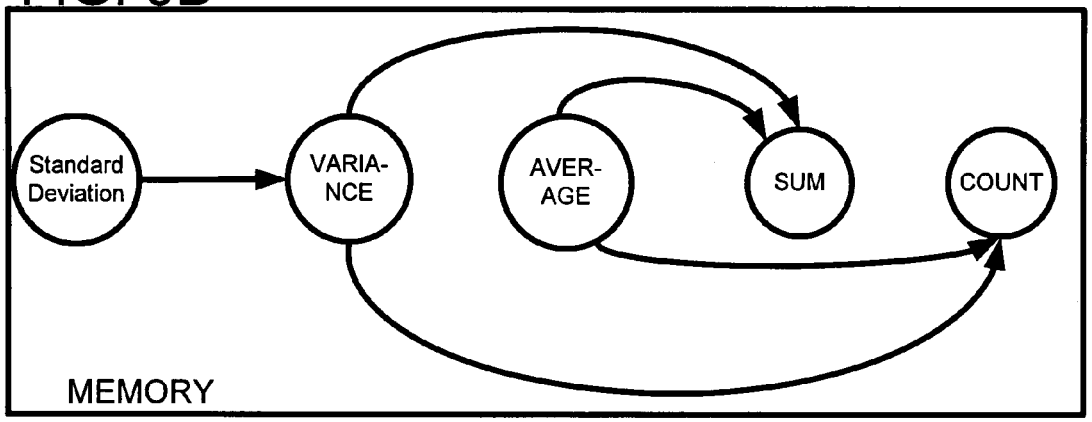
Figure 3E:
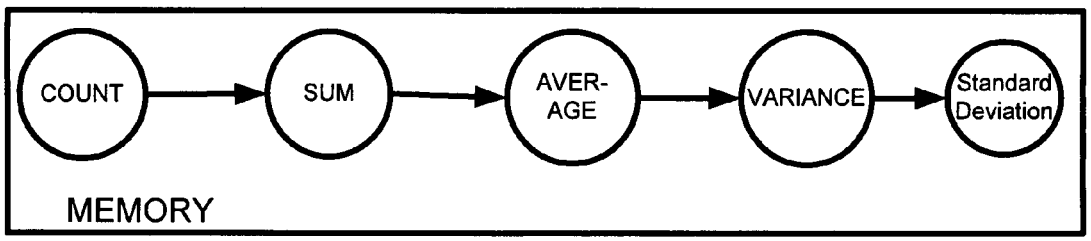

As shown in FIG. 3A, an aggregation definition module in extended DSMS 200 receives a command 202 to create a user defined aggregation (UDA) in act 311 and proceeds to act 312. In act 312, the command 202 is parsed and validated, followed by act 313. During validation the computer not only checks the syntax of command 202, but also checks if a Java class specified in argument 267 is accessible and if the to-be-used aggregations 270 have been defined. Such checking is performed recursively, i.e. within the Java classes and the aggregations. Therefore, the checking identifies and reports to the user any cycles between aggregation definitions, e.g. if a first aggregation references a second aggregation which in turn references the first aggregation either directly or indirectly. In act 313, extended DSMS 200 stores one or more pieces of information about aggregation a (called "metadata") that were received in command 202, for later use when a query 203 is received. Aggregation a's metadata may include one or more of pieces of information 263, 265 and 267 illustrated in FIG. 2B and described above. In particular, presence of words 268 is flagged in act 313, for future use in the incremental manner of invocation, of a function to execute the aggregation, in act 506. Hence, in the embodiment shown in FIG. 3A, in act 313, extended DSMS 200 (a) instantiates a factory method of the predetermined name described above; and (b) maps the user-defined aggregation function's name (or the function's identifier that is uniquely assigned by extended DSMS 200) to the instance created by the just-described act (a).

In some embodiments, metadata on aggregation a is stored in store 280 in an arrangement similar or identical to storage of the corresponding information for a built-in aggregation.

On performance of act 313, an expression evaluator in DSMS 200 is automatically reconfigured to use the aggregation a's metadata to henceforth recognize the user defined aggregation a as valid, and to invoke the set of instructions 201 for aggregation a. Extended DSMS 200 performs one or more acts depending on the embodiment, to store metadata of aggregation a in a store 280. Aggregation a's metadata forms a single entry among a number of metadata entries for UDAs in store 280 that are accessible to query compiler 210 in DSMS 200.

An illustration of aggregation a's metadata entry in store 280 in some embodiments is shown in FIG. 3B. The metadata entry typically includes a name 381 of the function and a reference 382 to the set of instructions for the function. In some embodiments, a reference 382 is a copy of information piece 267 which is extracted from command 202. In some embodiments, an aggregation's metada entry also holds information useful in data type checking of a query's usage of aggregation a during query compilation, such as the number of arguments and the data type of each argument. This is illustrated in FIG. 3B by the number 383 of arguments that are input to the aggregation a, a list 384 of argument names, a list 385 of data types of these arguments, and a data type 386 of the return value for this aggregation.

The embodiment of metadata entry illustrated in FIG. 3B can have any number N of argument names 384A-384N, with a corresponding number N of data types, and the number N is stored in field 383 of the metadata entry. As will be apparent to the skilled artisan, other embodiments may maintain the information in such a metadata entry in a different order, or even maintain other information that is useful in compilation of a new continuous query based on user defined aggregation a. Note that alternative embodiments may maintain data type checking information in a location other than the metadata entry.

In some embodiments of the kind illustrated in Subsection A below, in act 313 the computer automatically instantiates using reflection a factory method of a predetermined name "IaggrFnFactory" from the package provided by the user, e.g. myPkg. At this time, the computer has not yet created an instance of the aggregation method "IaggrFunction" which is also included in the user's package (e.g. set of instructions 201 in FIG. 2A); instead the computer has an instance of the factory method, which contains a path to reach the aggregation method.

After command 202 is processed by aggregation definition module 310, the user may now issue a new continuous query 203 which uses the user defined aggregation a. In some embodiments, continuous query 203 is expressed in continuous query language CQL of the kind described in the background section above. Query 203 may include a reference to the new user defined aggregation a only in certain places therein. In some embodiments, an aggregation a can be included in a select list of a query q, but not in the wherein clause of the query. In certain embodiments, the aggregation a cannot be included in any expression. Also, depending on the embodiment, aggregation a may be invoked with arguments which are themselves expressions of any data from a tuple currently being processed. In several embodiments, such a query may use any number of user defined aggregations and/or built-in aggregations, although they cannot be nested relative to one another.

Extended DSMS 200 receives continuous query 203 as per act 321 and parses the query (FIG. 3A) and thereafter semantically validates the query as per act 322. Next, a logical plan is created in act 323, followed by a physical plan in act 324, followed by an execution plan in act 325, followed by act 326 which modifies a query execution plan that is currently in use. In act 324 (FIG. 3A), a continuous query compiler 210 within extended DSMS 200 uses the aggregation a's metadata on encountering the use of aggregation a in a physical operator of the physical plan, to invoke the aggregation function. Continuous query compiler 210 (FIG. 2A) typically includes logic (such as a parser) to identify use of functions in continuous queries. Accordingly, query compiler 210 creates a tree 220 for the new query, including an operator (also called "aggregation" operator or "groupby" operator) containing a predetermined opcode (such as UDA-INT) to invoke user defined aggregations with an integer input, and one or more data structure(s) to hold information specific to each aggregation.

Note that any duplicate aggregations specified in the new query are handled in the logical plan, and hence all aggregation operators in the physical plan are unique. Specifically, if the new query specifies a given aggregation multiple times, then a single data structure for the given aggregation is used in the aggregation operator, and the same output is mapped to the multiple occurrences in the query. Accordingly, the same data is in fact returned multiple times, if a query so requires, by the logical plan.

If the new query specifies multiple aggregations that are different from one another (e.g. Variance, MAX, AVG), then all such aggregations are placed in a list which is included in the aggregation operator. If the list does not include any other aggregations (e.g. Sum and Count) that are used within any of the aggregations (e.g. Variance) in the list, then query compiler 210 automatically adds these other aggregations to the list. After creation of a physical plan as per act 324, query compiler 210 goes to act 322B and builds a graph using aggregations as nodes and inserts directed edges between each node and any aggregations it uses. An illustrative graph resulting from act 322B for a query that uses standard deviation, variance and average is shown in FIG. 3C.

Next, in act 322C, nodes in the graph are sorted in topological order (as shown in FIG. 3D), followed by preparing a list in the reverse order (as shown in FIG. 3E). This reverse topologically-ordered list (e.g. FIG. 3E) provides a temporal sequence in which the aggregations are to be computed during execution of the query. Next, the list is used, along with the physical tree for the new query, to modify the currently executing plan in act 322D. After act 322D, an act 323 (FIG. 3A) is performed wherein query compiler 210 alters the processing of queries, by invoking a scheduler to allocate time slots for the newly added operator, thereby to cause new continuous query q to be automatically executed by query execution engine 230.

As shown in FIG. 3A, at an appropriate time, query execution engine 230 awakens the newly added operator in act 331 and then goes to act 332. In act 332, engine 230 checks if a new tuple of data has been received. If not, then engine 230 goes to sleep as per act 336, to be eventually awakened in the next time slot (as shown by act 337). In act 332, if a new tuple has been received, engine 230 performs various acts in the normal manner, and eventually goes to act 333 to check if an aggregation is to be evaluated. If so, then control transfers to act 334 wherein an aggregation evaluator invokes the specified aggregation function's instance, to evaluate each of the user defined aggregations in the reverse topologically sorted list, with user-specified argument(s) from the new tuple, followed by release. In act 334, the engine 230 executes the set of instructions 201, which are identified from information in the opcode-specific data structure. In some embodiments of act 334, execution engine 230 instantiates set of instructions 201, as many times as the number of groups of data in the data streams, as discussed below. After act 334, engine 230 goes to act 335 to perform specific functions of the DSMS operator, such as the group by function, followed by going to sleep as per act 336.

In some embodiments, the same identifier (e.g. from reference 382) is repeatedly used in act 333 in instantiating the set of instructions 201 for multiple data groups required by user defined aggregation a. The identifier is obtained in act 333 by looking up the aggregation's metadata entry in store 280, using the aggregation's name as an index. Such an identifier may be copied into an opcode-specific data structure by compiler 210 and thereafter used by engine 230 in expression evaluation as per act 333. Note that there are as many instances in the new operator as there are groups of data, in certain embodiments. For example, data may be grouped by tickerID, in a stream of stock quotes, and the secondMax price for a given stock (e.g. tickerID ORCL) can be determined by aggregation. In certain embodiments, there are as many groups (and instances) as there are unique values of tickerIDs in a given time interval. Hence, if in the time interval, all trades were only for ten stocks then there are ten groups (and accordingly ten instances of the set of instructions 201).

Note that the above-described metadata entry of the aggregation is used to process the new tuple, e.g. to prepare input argument(s) for the UDA (e.g. set of instructions 201), and to identify an appropriate version of the UDA to be used based on the data type of one or more argument(s). The input arguments are normally passed in to the UDA as an array of objects (such as an array of integers, real numbers etc). Such transfer uses a mapping of data types between (1) data types in a predetermined language in which user's aggregation is expressed (e.g. Java), and (2) data types in extended DSMS 200, as illustrated in Subsection A below. Also, note that query receipt, compilation and execution are performed by some embodiments of extended DSMS 200 (FIG. 2A) while processing incoming streams of data 250 by executing thereon one or more continuous queries that were already being executed ("existing queries") prior to receipt of the new continuous query q.

Figure 4:
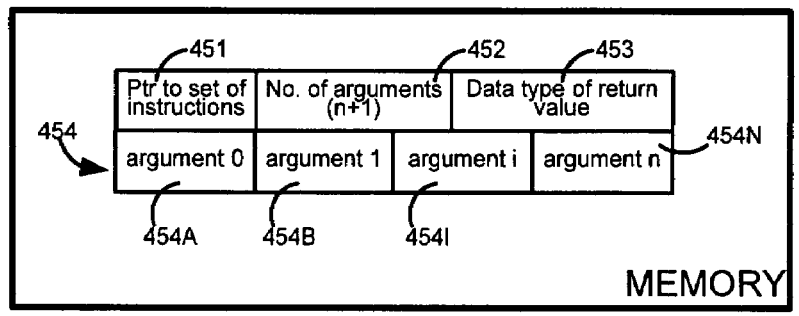
FIG. 4 illustrates, in a block diagram, a structure created within an aggregation operator by some embodiments of the method of FIG. 3A for use in executing the continuous query based on a user defined aggregation.

Some embodiments of extended DSMS 200 use an opcode-specific data structure as illustrated in FIG. 4. Specifically, such a data structure includes the following fields: a first field 451 holds a pointer to the set of instructions, a second field 452 holds the number of arguments, a third field 453 holds the data type of the value to be returned by the user defined aggregation. The data structure also includes a number of fourth fields 454A-454N, which are equal in number to the value in second field 452. The just-described opcode-specific data structure is used in some embodiments by an expression evaluator of the kind illustrated in FIG. 5, as discussed next.

In response to receipt of a new event in act 501, an expression evaluator of some embodiments performs act 502 to determine the value of a GROUPBY attribute, if the data is being grouped by the query q. If the data is being grouped, typically an index is used on an output store of the operator, and index keys thereof form the values of the attribute. In the above-described example, tickerID is the attribute and ORCL is the value.

Next, in act 503, the aggregation evaluator determines if an aggregation function already exists for the value determined in act 502 and if so goes to act 505. If in act 503 the answer is yes, then act 504 is performed wherein an aggregation value is allocated with a count of 0, and a pointer to an instance of the aggregation function is initialized to the instance just created, followed by going to act 506. Note that a user's initialization function, if any, is invoked only at function instantiation time.

More specifically, in act 504 the aggregation evaluator invokes the factory method for the UDA by beginning execution of the in-memory instance of the set of instructions 201 (e.g. see "IAggrFnFactory" in Subsection A below). The factory method may select an appropriate one of several versions of the UDA, based on the data type(s) of one or more argument(s). For example, an integer input and integer output version of the UDA may be selected, if the input data from the current tuple is integer. When the factory method completes, an instance of the UDA (e.g. "IAggrFunction") is present in memory, ready for use. Note that instance creation is skipped if the instance (for the current tuple's attribute value) is already created, e.g. if the count is non-zero on entering act 504.

Referring back to act 505, the aggregation evaluator checks if a type of the message that is being processed is plus and if so goes to act 506 and otherwise if minus goes to act 507. A value of the message type is identified in a message (also called element) which includes, in addition to the tuple, a type and a timestamp. Plus messages are received when tuples enter a window and minus messages are received when the tuples exit the window. If the message is of the plus type, the aggregation evaluator increments the count in act 506, and thereafter goes to act 508. If the message is of the minus type then the aggregation evaluator decrements the count in act 507 and goes to act 509.

Acts 508 and 509 are similar to one another, and in both acts methods of function instances are invoked, except that in act 508 "plus" methods are invoked whereas in act 509 "minus" methods are invoked. Note that there are N function instances corresponding to N aggregations in a reverse topologically sorted list that is maintained in the DSMS operator. A method of each of the N function instances is invoked, in the order specified in the list as per the respective loops implemented by pairs of acts 508A, 508B and 509A,509B. When each method is invoked, it receives as its arguments, the current message and also zero or more values of previously computed aggregations in the list as appropriate. After performing either one of acts 508 and 509, the aggregation evaluator performs act 511 wherein the aggregation evaluator checks if the count is zero, and if so goes to act 512 and otherwise goes to act 513. In act 513, the aggregation evaluator copies a result returned from the aggregation function to the output and thereafter exits this method. In act 512, the aggregation evaluator releases the aggregation context (including the function instance) and thereafter goes to act 513 (described above).

In some embodiments, in acts 508 and 509, the aggregation evaluator invokes the respective methods (e.g. "handleMinusInt(int, aggregation_value_array)", "handlePlusInt(int, aggregation_value_array)") in the instance (e.g. "IAggrFunction" in Subsection A below) of the user-defined aggregation function. The version of predetermined function that is invoked depends on the data types of input and the type of input "plus" or "minus." Specifically, in certain embodiments there are four versions, one for each of the four combinations of (integer, float, "plus"/"minus")—the functions are
handlePlusInt(int, aggregation_value_array)
handlePlusFloat(float, aggregation_value_array)
handleMinusInt(int, aggregation_value_array)
handleMinsFloat(float, aggregation_value_array)

Note that since the user knows which datatypes to expect, he/she needs to write the corresponding "plus" and "minus" functions only for the datatypes supported.

Figure 5:
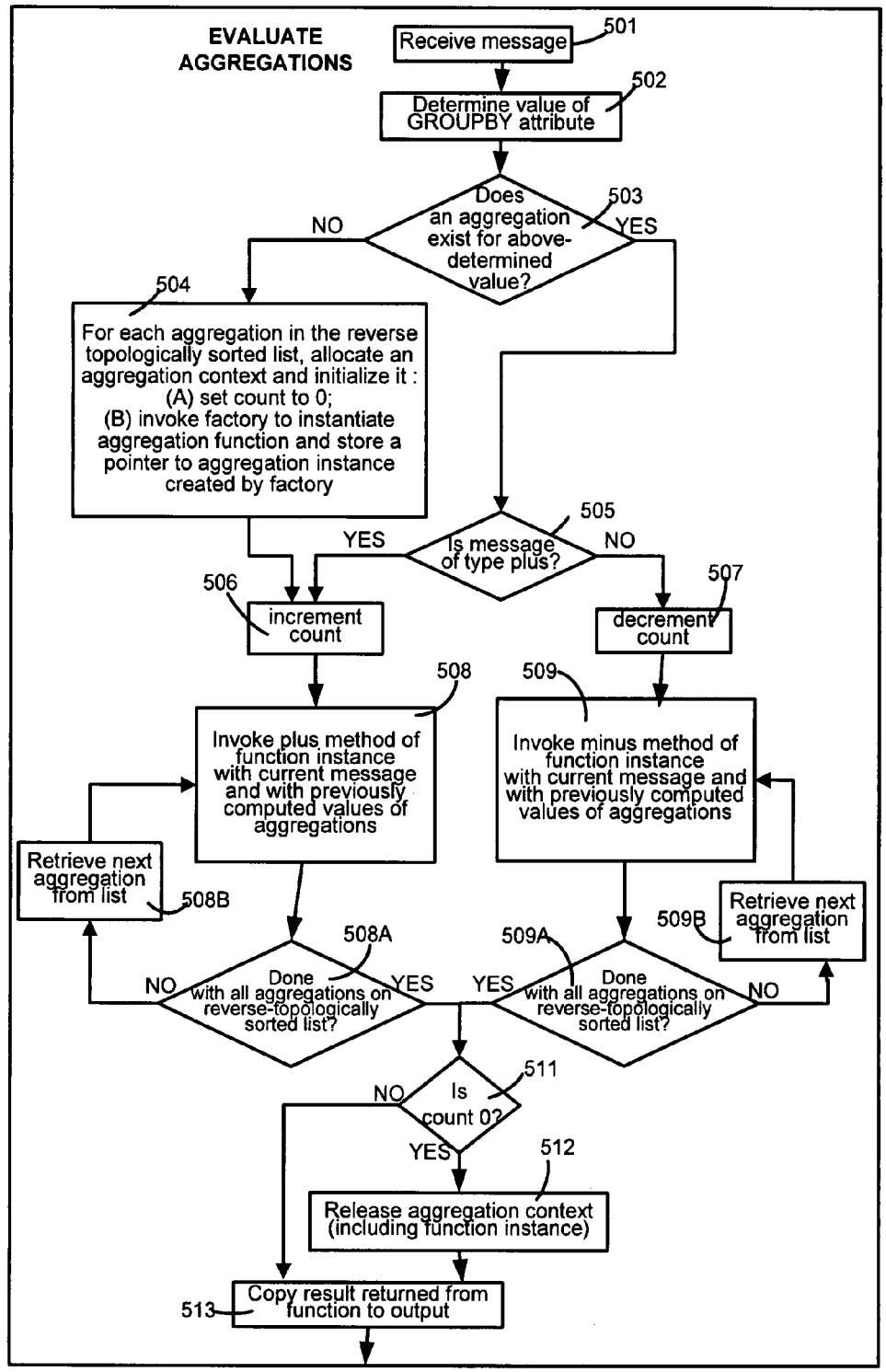
FIG. 5 illustrates, in another flow chart, a method performed by the extended DSMS of FIG. 2A, in some embodiments of the invention, to execute the continuous query compiled as per the method of FIG. 3A.

In the embodiment illustrated in FIG. 5, each of the one or more predetermined methods of the user-defined aggregation is written by the user to operate incrementally, one tuple at a time, and hence at this time the plus method is invoked once (in act 506), to process the plus message received in act 501. The method in the user-defined aggregation operates incrementally across a whole set of tuples currently in the window by maintaining information (also called "state information") in memory across multiple calls, until an initialize function is called (as per act 505) at which time the memory is reset. The specific information which is maintained depends on the aggregation. For example, a handler for Variance in its context maintains the following information on tuples in the window prior to the current message: sum, count, and sum of squares.

After act 506, the aggregation evaluator returns (as per act 507) a single result which is obtained from the predetermined method in act 506. Thereafter, the aggregation evaluator continues with processing of the expression in the continuous query, in the normal manner.

In act 508, if the received message was of minus type, the aggregation evaluator simply decrements the count. At this stage, if the count is non-zero, the aggregation evaluator illustrated in FIG. 5 goes from act 509 to act 506 to invoke the predetermined function for the current message. Note that the minus function (e.g. handleMinusFloat in case of variance) is now invoked in act 506, to process the minus message received in act 501. In alternative embodiments, if the user has not provided any minus function and also not used the reserved words 268 in command 202 (FIG. 2B), then the aggregation evaluator initializes the instance (as per act 505) and invokes the instance to perform the plus function. In such alternative embodiments, all tuples in the current window need to be supplied to the plus function, which is accordingly invoked multiple times (as per act 506), once for each tuple in the window which has the value of the attribute for the current tuple.

If the number of tuples in the window goes to zero in act 508, then the aggregation evaluator invokes the release function in the factory method, which in turn deletes the instance, and releases memory. After acts 507 and 509, the aggregation evaluator uses the result to evaluate the rest of the expression, and the execution engine continues with processing the query in the normal manner.

Note that a DSMS operator of many embodiments does not maintain a store of messages. Instead, as noted above, at least two methods of the aggregation function, namely a "plus" method and a "minus" method are written by a user to respectively process a single "plus" message and a single "minus" message, i.e. only one message at a time. Hence, to support such functionality, both methods maintain state information internally which is shared therebetween and is sufficient for either of these two methods to compute the value of the aggregation at a next iteration (depending on whichever of the two types of messages is next received). For example, if the aggregation is average, the handle maintains internally, two state variables namely: (a) the number of tuples and (b) the sum of tuples, which are together sufficient to compute an average on the next iteration (by adding/deleting the next tuple's value to/from the sum and dividing by an incremented/decremented number of tuples). A set of instructions 201 representing such software is illustrated below, in Subsection B.

An example of a stream of stock ticker prices is now described to further illustrate the operation of an exemplary embodiment of the invention. In this example, DSMS 200 contains a source of the data stream TradeStream, with each message in the stream containing at least the value of a tickerSymbol and the value of its tradeVolume. In this example, the user has created the user-defined aggregation variance and stddev and may then issue the following query:

Q2: Select variance(tradeVolume), stddev(tradeVolume), tickerSymbol
from TradeStream[range 1 hour]
group by tickerSymbol To execute Q2 in the above example, DSMS 200 initially creates two instances of the IAggrFunction (one instance for variance and another instance for stddev), for each unique value of the tickerSymbol as messages arrive in TradeStream. For example if the first message received at time 0 has tickerSymbol of value GOOG then a pair of instances of IAggrFunction are created (in act 504 in FIG. 5), which in turn instantiate and initialize the functions variance and stddev, and store a pair of pointers to these instances (also in act 504). Next, count is incremented in act 506 to 1. The "plus" methods of instances of the functions variance and stddev are then invoked in this order, in act 508. For the plus method of variance, only a message received at time 0 is passed as an argument. For the plus method of stddev, the message received at time 0 is passed as an argument, along with the aggregation value returned by the plus method of variance as another argument. After the stddev aggregation completes execution, this is followed by nothing that count is not zero in act 511, followed by copying out the results of variance and stddev in act 513.

In the example, at time 20 minutes later, a second message also of tickerSymbol value GOOG is received. As it is within one hour of the first message, it belongs to the same set as the first message. In processing this second message, the act 504 is skipped and instead control transfers to 506 wherein count is incremented to 2, and instances of variance and stddev are identified based on the attribute value determined in act 503. For the plus method of variance, only a message received at time 20 is passed as an argument. For the plus method of stddev, the message received at time 20 is passed as an argument, along with the aggregation value returned by the plus method of variance as another argument. After the stddev aggregation completes execution, this is followed by nothing that count is not zero in act 511, followed by copying out the results of variance and stddev in act 513.

In the example, a third message is received at time 30 minutes later, with tickerSymbol value ORCL which is a new value, and hence the "no" branch is taken from act 503, and new instances of IAggrFunction are created in act 504 which in turn instantiate and initialize new instances of variance and stddev for use with this new tickerSymbol value ORCL. For the plus method of variance, only a message received at time 30 is passed as an argument. For the plus method of stddev, the message received at time 30 is passed as an argument, along with the aggregation value returned by the plus method of variance as another argument. After the stddev aggregation completes execution, this is followed by nothing that count is not zero in act 511, followed by copying out the results of variance and stddev in act 513.

One hour after receipt of the first message, i.e. at time 60 minutes later the first message leaves the range window, and hence a "minus" type message is generated by a range window operator RW for tickerSymbol value GOOG, and in response to receipt of this message, the count is decremented in act 507. For the minus method of variance, only a message received at time 60 is passed as an argument. For the minus method of stddev, the message received at time 60 is passed as an argument, along with the aggregation value returned by the minus method of variance as another argument. After the stddev aggregation completes execution, this is followed by nothing that count is not zero in act 511, followed by copying out the results of variance and stddev in act 513.

One hour after the second message is received, i.e. at a time 80 minutes later, the second message also leaves the range window, and hence another "minus" type message is received for tickerSymbol value GOOG, and this time when count is decremented in act 507, the count value falls to 0, and so after performance of act 509 to invoke the "minus" methods, act 512 is performed to release the aggregation contexts for variance and stddev which were originally allocated in act 504 when the first message for tickerSymbol value GOOG was received at time 0, followed by copying the results in act 513.

Accordingly, in view of the above description, several embodiments support scalability and provide improved performance by supporting the incremental processing of user defined aggregations in an extended DSMS. Specifically, the inventors of the current patent application have reduced, in some embodiments, the cost of (re)computation on arrival of new events to be proportional to the number of new events as opposed to the total number of events seen thus far.

Note that in some embodiments, writing of a user-defined aggregation function to generate an aggregation value in response to a single message, without access to an entire set of values over which aggregation is being performed is non-trivial. Hence, in certain cases, the user-defined aggregation is explicitly written to receive and process an entire set of values over which aggregation is to be performed, in response to each message, as described in the related U.S. patent application Ser. No. 11/977,437 entitled "SUPPORT FOR INCREMENTALLY PROCESSING USER DEFINED AGGREGATIONS IN A DATA STREAM MANAGEMENT SYSTEM" that is filed on Oct. 20, 2007 and incorporated by reference above.

Figure 6:
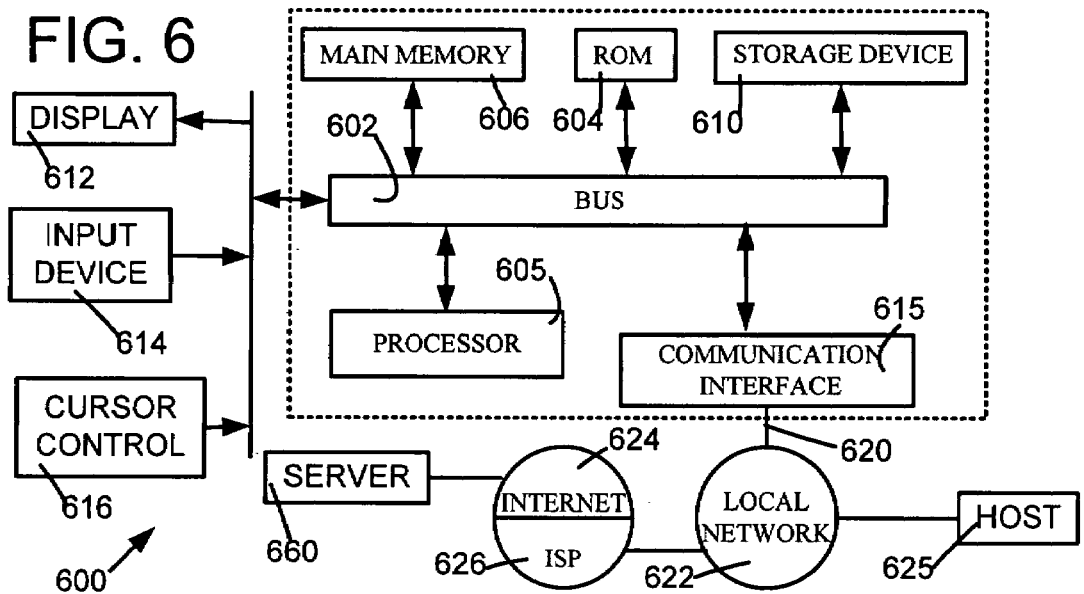
FIG. 6 illustrates, in a high level block diagram, hardware included in a computer that may be used to perform the methods of FIGS. 3A and 5 in some embodiments of the invention.

Note that the extended data stream management system 200 may be implemented in some embodiments by use of a computer (e.g. an IBM PC) or workstation (e.g. Sun Ultra 20) that is programmed with an application server, of the kind available from Oracle Corporation of Redwood Shores, Calif. Such a computer can be implemented by use of hardware that forms a computer system 600 as illustrated in FIG. 6. Specifically, computer system 600 includes a bus 602 (FIG. 6) or other communication mechanism for communicating information, and a processor 604 coupled with bus 602 for processing information.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying to a computer user, any information related to DSMS 200 such as a data stream 231 that is being output by computer system 600. An example of data stream 231 is a continuous display of stock quotes, e.g. in a horizontal stripe at the bottom of display 612. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

As described elsewhere herein, incrementing of multi-session counters, shared compilation for multiple sessions, and execution of compiled code from shared memory are performed by computer system 600 in response to processor 604 executing instructions programmed to perform the above-described acts and contained in main memory 606. Such instructions may be read into main memory 606 from another computer-readable medium, such as storage device 610. Execution of instructions contained in main memory 606 causes processor 604 to perform the process steps described herein. In alternative embodiments, hard-wired circuitry may be used in place of or in combination with software instructions to implement an embodiment of the kind illustrated in FIGS. 3A and 5. Thus, embodiments of the invention are not limited to any specific combination of hardware circuitry and software.

The term "computer-readable storage medium" as used herein refers to any storage medium that participates in storing instructions for supply to processor 604 for execution. Such a storage medium may take many forms, including but not limited to, non-volatile storage media, volatile storage media. Non-volatile storage media includes, for example, optical or magnetic disks, such as storage device 610. Volatile storage media includes dynamic memory, such as main memory 606.

Common forms of computer-readable storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other storage medium on which information can be stored and from which a computer can read.

Various forms of computer readable storage media may be involved in carrying the above-described instructions to processor 604 to implement an embodiment of the kind illustrated in FIG. 5. For example, such instructions may initially be carried on a magnetic disk of a remote computer. The remote computer can load such instructions into its dynamic memory and send the instructions over a telephone line using a modem. A modem local to computer system 600 can receive such instructions on the telephone line and use an infra-red transmitter to convert the received instructions to an infra-red signal. An infra-red detector can receive the instructions carried in the infra-red signal and appropriate circuitry can place the instructions on bus 602. Bus 602 carries the instructions to main memory 606, in which processor 604 executes the instructions contained therein. The instructions held in main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. Local network 622 may interconnect multiple computers (as described above). For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Transmission media includes coaxial cables, copper wire and fiber optics, including the wires that comprise bus 602. Transmission media can also take the form of acoustic or light waves, such as those generated during radio-wave and infrared data communications.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network 628 now commonly referred to as the "Internet". Local network 622 and network 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 530 might transmit a code bundle through Internet 628, ISP 626, local network 622 and communication interface 618. In accordance with the invention, one such downloaded software implements an embodiment of the kind illustrated in FIGS. 3A and 5. The received software may be executed by processor 604 as received, and/or stored in storage device 610, or other non-volatile storage for later execution. In this manner, computer system 600 may obtain the software in the form of a carrier wave.

Other than changes of the type described above, the data stream management system (DSMS) of several embodiments of the current invention operates in a manner similar or identical to Stanford University's DSMS. Hence, the relation operator in such a computer propagates any new tuples that have a new time stamp to all query operators coupled thereto, including the newly coupled query operator. In this manner, a computer that is programmed in accordance with the invention to receive and execute new continuous queries while continuing to operate on existing continuous queries, without prior art issues that otherwise arise from updating relation operators during modification of an executing plan.

Numerous modifications and adaptations of the embodiments described herein will be apparent to the skilled artisan in view of this current disclosure. Accordingly numerous such modifications and adaptations are encompassed by the attached claims.

Following Subsection A is an integral portion of the current patent application and is incorporated by reference herein in their entirety. Subsection A describes one illustrative embodiment in accordance with the invention.

Subsection A (of Detailed Description)

The user-defined aggregation with incremental computation with derivations needs to implement the following interface:

```
public interface IAggrFnFactory {
  /**
   * Factory method for creating a stateful handler for the corresponding
   * aggregate function
   * @return a new handler corresponding to the aggregate function
   */
  public IAggrFunction newAggrFunctionHandler( ) throws
UDAException;
  /**
   * Release an already instantiated handler
   * @param handler the already instantiated aggregate function handler
   */
  public void freeAggrFunctionHandler(IAggrFunction handler) throws
UDAException;
}
``` where IAggrFunction is as follows:

```
public interface IAggrFunction {
  /**
   * Method to initialize the context for a fresh round of aggregate
   * computation
   */
  public void initialize( ) throws UDAException;
  /**
   * Method to handle the next element of the group. The input type
   * is an array of Objects and the return type is an Object
   * Object can be either of INT, FLOAT, BIGINT, CHAR, TIMESTAMP
   * @param args input value
   * @param result of the aggregation function so far
   */
  public void handlePlus(Object[ ] args, Object[ ] depArgs, Object result) throws
UDAException;
  /**
   * Method to handle the next element of the group. The input type
   * is an array of Objects and the return type is an Object
   * Object can be either of INT, FLOAT, BIGINT, CHAR, TIMESTAMP
   * @param args input value
   * @param result of the aggregation function so far
   */
  public void handleMinus(Object[ ] args, Object[ ] depArgs, Object result) throws
UDAException;
}
// Standard deviation is square root of variance, so the arguments can be totally
ignored
public class MyStandardDeviation implements IAggrFnFactory, IAggrFunction
{
 public IAggrFunction newAggrFunctionHandler( ) throws UDAException { return new
MyStandardDeviation( ); }
 public void freeAggrFunctionHandler(IAggrFunction handler) throws UDAException {
}
 public void initialize( ) throws UDAException { }
 public void handlePlus(Object[ ] args, Object[ ] depArgs, Object res) throws
UDAException
    {
      float f= ((Float)depArgs[0]).floatValue( );
      AggrFloat result = (AggrFloat)res;
      result.setValue(Math.sqrt(f));
    }
 public void handleMinus(Object[ ] args, Object[ ] depArgs, Object res) throws
UDAException
    {
      float f= ((Float)depArgs[0]).floatValue( );
      AggrFloat result = (AggrFloat)res;
      result.setValue(Math.sqrt(f));
    }
}
```

What is claimed is:

1. A method implemented in a computer of processing a plurality of streams of data, the method comprising:

processing the plurality of streams, to execute thereon a plurality of continuous queries based on a global plan;

during the processing, receiving a command to create a first aggregation and a first identification of a set of instructions comprising a function to be executed to perform the first aggregation;

during the processing, receiving a second identification of a second aggregation to be used by the first aggregation;

during the processing, creating in a memory of the computer, a first structure comprising the first identification and the second identification;

during the processing, receiving a new continuous query to be executed using the first aggregation;

during the processing, based on the first structure, creating in the memory an operator comprising at least one second structure, the second structure comprising a first field to hold a reference to the instance, and at least one additional field corresponding to at least one argument of the first aggregation;

during the processing, building in the memory a graph representing a plurality of aggregations as nodes;

wherein the plurality of aggregations comprises said first aggregation and said second aggregation;

wherein a plurality of directed edges are included in the graph, between each node and a group of nodes whose results are used by said each node;

during the processing, performing a sort on the graph, and using a result of the sort to store, in the memory, a temporal order for executing the plurality of aggregations;

during the processing, modifying the global plan in the memory by adding thereto the operator based on the temporal order, thereby to obtain a modified plan in the memory; and altering the processing, to cause execution of the new continuous query in addition to the plurality of continuous queries, based on the modified plan in the memory;

during execution of the new continuous query creating in the memory an instance of the set of instructions;

invoking the function in the instance to process a tuple of the data received in a message, wherein the function is identified based at least on a type of the message; and releasing in the memory, space occupied by the instance, in response to a predetermined condition being met.

2. The method of claim 1 wherein:

the second identification is received in said command, adjacent to the first Identification.

3. The method of claim 1 further comprising:

receiving with the command, identification of a value of a data type of the at least one argument;

wherein the function is further identified, for use in the invoking, based at least on the value of the data type.

4. The method of claim 1 wherein:

the first structure further comprises a first name of the first aggregation and a second name of the second aggregation; and the first structure further comprises at least another data type of value to be returned by the aggregation.

5. A computer-readable storage medium comprising instructions to a computer to process a plurality of streams of data, the instructions comprising:

instructions to process the plurality of streams, to execute thereon a plurality of continuous queries based on a global plan;

instructions to receive a command to create a first aggregation and a first identification of a set of additional instructions comprising a function to be executed to perform the first aggregation;

instructions to receive a second identification of a second aggregation to be used by the first aggregation;

instructions to create in a memory of the computer, a first structure comprising the first identification and the second identification;

instructions to receive a new continuous query to be executed using the first aggregation;

instructions, based on the first structure, to create in the memory an operator comprising at least one second structure, the second structure comprising a first field to hold a reference to the instance, and at least one additional field corresponding to at least one argument of the first aggregation;

instructions to build in the memory a graph representing a plurality of aggregations as nodes;

wherein the plurality of aggregations comprises said first aggregation and said second aggregation;

wherein a plurality of directed edges are included in the graph, between each node and a group of nodes whose results are used by said each node;

instructions to perform a sort on the graph, and use a result of the sort to store, in the memory, a temporal order for executing the plurality of aggregations;

instructions to modify the global plan in the memory by adding thereto the operator based on the temporal order, thereby to obtain a modified plan in the memory; and instructions to cause execution of the new continuous query in addition to the plurality of continuous queries, based on the modified plan in the memory;

instructions to create in the memory an instance of the set of additional instructions;

instructions to invoke the function in the instance to process a tuple of the data received in a message, wherein the function is identified based at least on a type of the message; and instructions to release in the memory, space occupied by the instance, in response to a predetermined condition being met.

6. The computer-readable storage medium of claim 5 wherein:

the second identification is received in said command, adjacent to the first identification.

7. The computer-readable storage medium of claim 5 further comprising:

instructions to receive with the command, identification of a value of a data type of the at least one argument;

wherein the function is further identified, for use in said instructions to invoke, based at least on the value of the data type.

8. The computer-readable storage medium of claim 5 wherein:

the first structure further comprises a first name of the first aggregation and a second name of the second aggregation; and the first structure further comprises at least another data type of value to be returned by the aggregation.

* * * * *

UNITED STATES PATENT AND TRADEMARK OFFICE
CERTIFICATE OF CORRECTION

PATENT NO. : 7,673,065 B2  Page 1 of 1
APPLICATION NO. : 11/977440
DATED : March 2, 2010
INVENTOR(S) : Anand Srinivasan et al.

It is certified that error appears in the above-identified patent and that said Letters Patent is hereby corrected as shown below:

In column 5, line 26, delete "asset" and insert -- a set --, therefor.

In column 8, line 17, delete "metada" and insert -- metadata --, therefor.

In column 13, line 9, delete "(trade Volume)," and insert -- (tradeVolume), --, therefor.

In column 13, line 9, delete "(trade Volume)," and insert -- (tradeVolume), --, therefor.

In column 19, line 28, in Claim 2, delete "Identification." and insert -- identification. --, therefor.

Signed and Sealed this

Twenty-first Day of September, 2010

David J. Kappos
*Director of the United States Patent and Trademark Office*